United States Patent
Miao

(10) Patent No.: US 7,269,403 B1
(45) Date of Patent: Sep. 11, 2007

(54) DUAL-MODE WIRELESS AND WIRED POWER LINE COMMUNICATIONS

(76) Inventor: George J. Miao, 2 Inverness Dr., Marlboro, NJ (US) 07746

( * ) Notice: Subject to any disclaimer, the term of this patent is extended or adjusted under 35 U.S.C. 154(b) by 420 days.

(21) Appl. No.: 10/859,777

(22) Filed: Jun. 3, 2004

(51) Int. Cl.
*H04M 9/00* (2006.01)

(52) U.S. Cl. .................. 455/402; 455/11.1; 455/17; 709/249

(58) Field of Classification Search ............. 455/402, 455/11.1, 17, 129, 552.1; 709/249
See application file for complete search history.

(56) References Cited

U.S. PATENT DOCUMENTS

| 6,131,136 | A | * | 10/2000 | Liebenow et al. | ....... 455/553.1 |
| 6,584,175 | B1 | * | 6/2003 | Kibria et al. | .............. 455/419 |
| 2002/0171535 | A1 | * | 11/2002 | Cern | ............. 340/310.07 |
| 2003/0210135 | A1 | * | 11/2003 | Cern | ............. 340/310.07 |
| 2004/0242185 | A1 | * | 12/2004 | Lee | ............................. 455/402 |
| 2005/0014535 | A1 | * | 1/2005 | Desai et al. | ........... 455/569.1 |
| 2005/0030118 | A1 | * | 2/2005 | Wang | .................... 333/24 R |
| 2005/0076149 | A1 | * | 4/2005 | McKown et al. | .......... 709/249 |

* cited by examiner

*Primary Examiner*—Joseph Feild
*Assistant Examiner*—Huy D Nguyen

(57) ABSTRACT

This invention presents a dual-mode wireless/wired power line communications that is used to carry signals with variable transmission data rates from 31.0 Mbps to 173.6 Mbps over a power line cable. The dual-mode wireless/wired power line communications can be seamlessly used either to connect with any wired devices over cable lines directly or to connect with any wireless devices without wires. This enables multiuser to access high-speed Internet over the wall power sockets, and to provide distribution of data and multiple data streams, such as voice over IP, audio and video, HDTV, throughout the home, office, hotel room or airport waiting area, and so on. On the other hand, using the dual-mode wireless/wired power line communications modem is to utilize the availability of an existing infrastructure of wires and wall outlets, thereby eliminating the requirements of new installation of power line cables.

20 Claims, 9 Drawing Sheets

DUAL-MODE WIRELESS AND WIRED POWER LINE COMMUNICATIONS

BACKGROUND

This invention is generally relative to a dual-mode wireless/wired power line communications.

Growing interest in the possibility of exploiting the power line is to provide wireless/wired broadband communication access to residential customers. The attractive of the idea is the presence of a vast infrastructure in place for power line distribution, and the penetration of the service could be much higher than any other wireless/wired alternative. This is because there is the prospect of reusing in-building power line cables to provide a broadband local area network at home or in office. The major advantage of using power line communication networks is the availability of an existing infrastructure of wires and wall outlets. Thus, new cable installation of power lines is not necessary.

It is feasible for in-build power line cables to deliver a very-high transmission data rate, such as over 100 Mbps. This enables a user to access high-speed Internet over the wall socket, and to provide distribution of data and multiple streaming, such as voice over IP, audio and video including high-definition television (HDTV) throughout the home or office. In addition, another possible application is the use of medium voltage network, such as a backbone to connect the low-voltage transformer stations to the Internet if the conventional backbone networks including fiber optical cables are not available. Thus, this new technology of the power line communication will be very well positioned to revolutionize in-build entertainment networking by using a simple, reliable, and cost-effective solution for end-user products, such as digital video recorders, media centers, personal computers, digital flat-panel television, and so on.

The development of appropriate power line communication approaches turns out to be a very challenge problem in wired broadband communications. This is because the power line cable channel is a very harsh and noisy transmission medium and extremely difficult to establish channel model exactly. The attenuation of power line cables is increased with higher frequencies. The transmission behavior of power line cable channel also has multipath propagation, which produces notches of the power line channel transfer function. This demonstrates two important power line channel properties: frequency-selective fading and frequency-dependent attenuation. Hence, the transmission characteristics are important in the power line channel. In addition, the interference scenario is important as well. This is because the power line cables are not additive white Gaussian noise (AWGN) channels. The interference scenario is complicated in terms of not only colored broadband noise but also narrowband interference and different types of impulsive disturbance. The interference scenario can be roughly classified into three classes: (1) a fairly low power spectral density that significantly increases toward lower frequencies characterizes colored background noise. It is happened due to household appliances such as computer, hair dryers, etc., in the frequency range of up to 30 MHz; (2) narrowband noise contains modulated sinusoids due to broadcast radio stations in the frequency range from 1 to 22 MHz; and (3) impulsive noise consists of periodic and aperiodic. Periodic impulsive noise is classified into synchronous or asynchronous to the mains frequencies including 50 or 60 Hz. Asynchronous portions show higher repetition rates from 50 to 200 kHz. As can be seen, the power line cables are very unusual channels, which were never designed for signal transmission at high frequencies.

The present invention of the dual-mode wireless/wired power line communications is to provide an integral wireless and wired power line communications for wall socket in an environment at home, in office, hotel rooms, or airport waiting room, etc. This invention by using advance signal processing and communication technologies is not only full capability for coding, modulation, source data encryption, adaptive bit loading with discrete-time multicarrier and transmission to overcome signal multipath propagation effects in the power line cable channels, but also has multiple-antenna strategies to overcome multipath propagation effects in the wireless channels. As a result, this present invention of the dual-mode wireless/wired power line communications can provide a variable transmission data rates from 31.0 MHz to 173.6 MHz in the downlink data streams. In the uplink data streams, the dual-mode wireless/wired power line communications can also achieve a variable transmission data rates from 15.5 MHz to 86.8 MHz. Therefore, there is a continuing need of the dual-mode wireless/wired power line communications.

SUMMARY

In accordance with one aspect, a dual-mode wireless/wired power line communications comprises a MIMO-based wireless modem, a power line communications modem, a micro-controller coupled to both of the MIMO-based wireless modem and the power line communications modem, and the MIMO-based wireless modem coupled to the power line communications modem and multiple antennas.

Other aspects are set forth in the accompanying detailed description and claims.

DETAILED DESCRIPTION

Some embodiments described herein are directed to the dual-mode wireless/wired power line communications. The dual-mode wireless/wired power line communication system may be implemented in hardware, such as in an Application Specific Integrated Circuits (ASIC), digital signal processor, microcomputer, field programmable gate array (FPGA), software, or a combination of hardware and software, as well as other materials.

Dual-Mode Wireless/Wired Power Line Communication Network System

Figure 1:
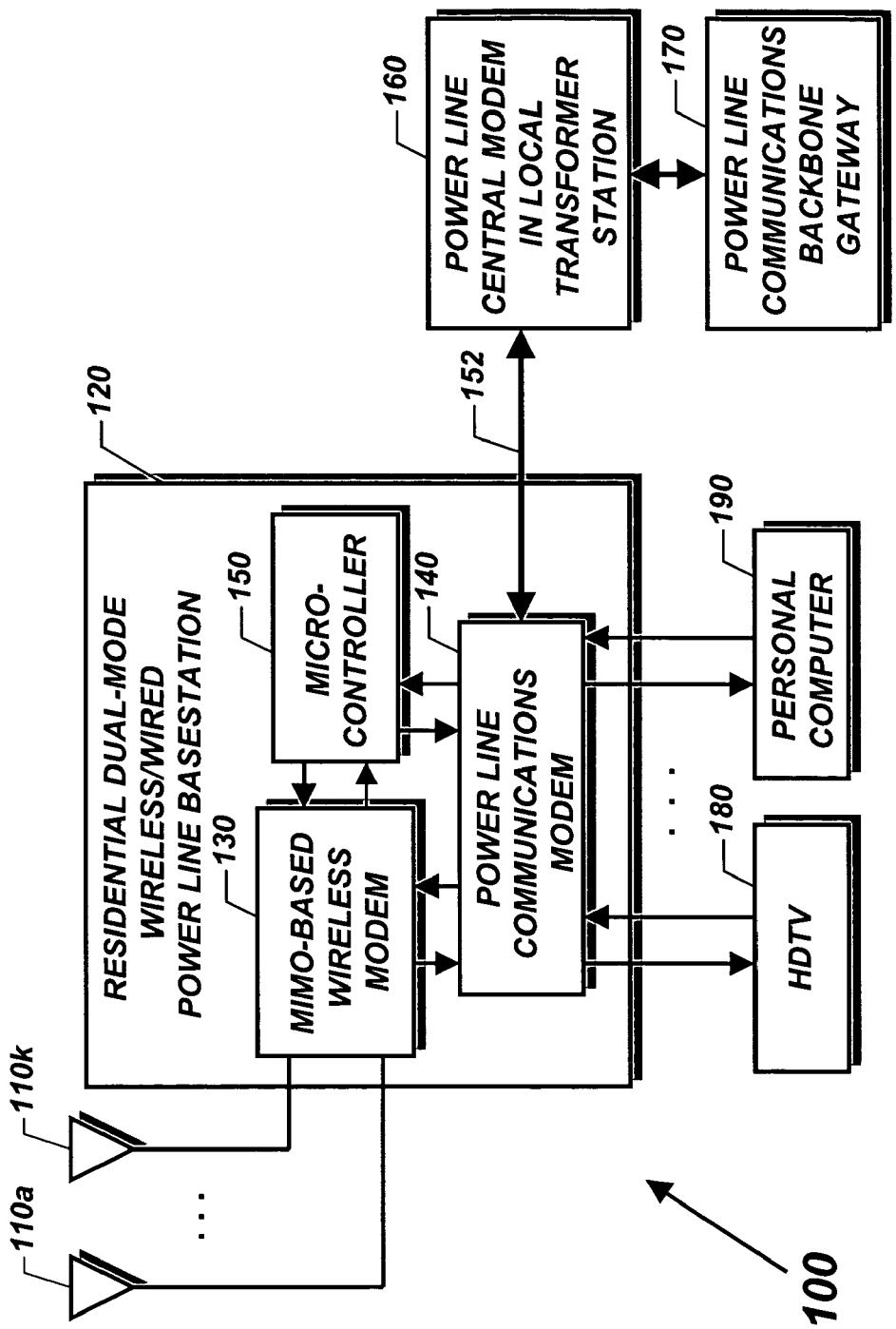
FIG. 1 is a block diagram of showing a dual-mode wireless/wired power line communication network system according to some embodiments.

A dual-mode wireless/wired power line communication network system 100 is shown in FIG. 1 in accordance with one embodiment of the present invention. A residential dual-mode wireless/wired power line communications basestation 120 consists of a multiple-input and multiple-output (MIMO)-based wireless modem 130, a power line communications modem 140 and a micro-controller 150. The MIMO-based wireless modem 130 is coupled to the power line communications modem 140 that is coupled to the micro-controller 150. The micro-controller 150 is coupled to both of the MIMO-based wireless modem 130 and the power line communications modem 140. Multiple antenna units from 110a to 110k are connected with the MIMO-based wireless modem 130. The power line communications modem 140 can directly connect to a HDTV 180, a personal computer 190, and so on. The power line communications modem 140 is also connected with a power line central modem in a local transformer station 160 over power line cables 152. The power line central modem in a local transformer station 160 is coupled to a power line communications backbone gateway 170.

The MIMO-based wireless modem 130 may be a wireless local area network (WLAN), such as WLAN 802.11b, 802.11a and 802.11g, 802.15, ultra wideband (UWB) transceiver, etc., or may be any combinations, such as dual/triple-mode WLAN transceivers. The MIMO-based wireless modem 130 may also be a third-generation (3G) or a fourth-generation (4G) wireless phone or a portable device transceiver that is able to communicate with any wireless phones or devices. This provides a seamless connection between wireless devices and the dual-mode wireless/wired power line communications. The MIMO-based wireless modem 130 has the multiple antenna units from 110a to 110k, which consist of distributed antenna elements whose outputs are combined or selected. The multiple antenna units from 110a to 110k along with advance signal processing and communication technologies are designed to adapt to different signal environments and to improve the quality of wireless communications systems for the dual-mode wireless/wired power line communications. In addition, the multiple antenna units from 110a to 110k mitigate multipath fading through diversity reception and beamforming while minimizing interference through spatial filtering. Moreover, the MIMO-based wireless modem 130 uses space-time adaptive signal processing (STASP) because of using the multiple antenna units. STASP jointly exploits the benefits of spatial processing and temporal processing to achieve dramatic improvements in co-channel interference (CCI) and inter-symbol interference (ISI) reduction, diversity combining, and array gain. Thus, the receiver of the MIMO-based wireless modem 130 uses STASP to resolve and combine multipath signals, providing dramatic improvements in diversity gain and signal-to-interference-noise ratio (SINR). On the other hand, the transmitter of the MIMO-based wireless modem 130 uses the increased degrees of freedom provided by STASP to minimize the interference radiated to other users and to maximize diversity gain by pre-filtering the signal in such a way that it is matched to the channel response, thereby improving the quality of the dual-mode wireless/wired power line communications system.

The present invention of the power line communications modem 140 uses a code division multiple access (CDMA)-based discrete multicarrier (DMC) modulation with an adaptive bit loading technology, 2-dimension (2-D) trellis coding modulation (TCM), and time- and frequency-domain equalizers. The DMC technology is to divide the available spectrum into subchannels in which those subchannels with deep notches are left unused. This enables to fully exploit spectral resources in the power line communications. Furthermore, the power line communications modem 140 can reduce the sensitivity to impulsive noise and ISI due to use the multicarrier modulation with subchannels. In addition, the user's data can be encrypted because of use the CDMA technology for scrambling, thereby increasing security of user's information during the power line transmission. The power line communications modem 140 also uses 2-D TCD. This enables the power line communications modem 140 to use multiple modulations including OPSK, 16-QAM, 32-QAM, 64-QAM and 128-QAM, and to provide different transmission data rates in the uplink and downlink data streams. With the present invention technologies, the power line communications modem 140 can transfer a variable transmission data rates from 31.0 Mbps to 173.6 Mbps over the power line cable in the downlink.

The power line communications modem 140 uses frequency-division duplexing (FDD), that is, the signals propagation in the upstream and downstream directions use the distinct frequency bands. As a result, FDD can simply power line loop unbundling and allow different operators to offer services in the same power line cable bundle without any common synchronization.

The main task of the dual-mode wireless/wired power line communications network system 100 is used to provide seamless broadband communications among any wireless devices and power line communications over power line cables, thereby creating another tremendous opportunity for users to access high-speed Internet at home, in office, hotel room, and airport waiting room environments.

Power Line Communications Architecture

Figure 2:
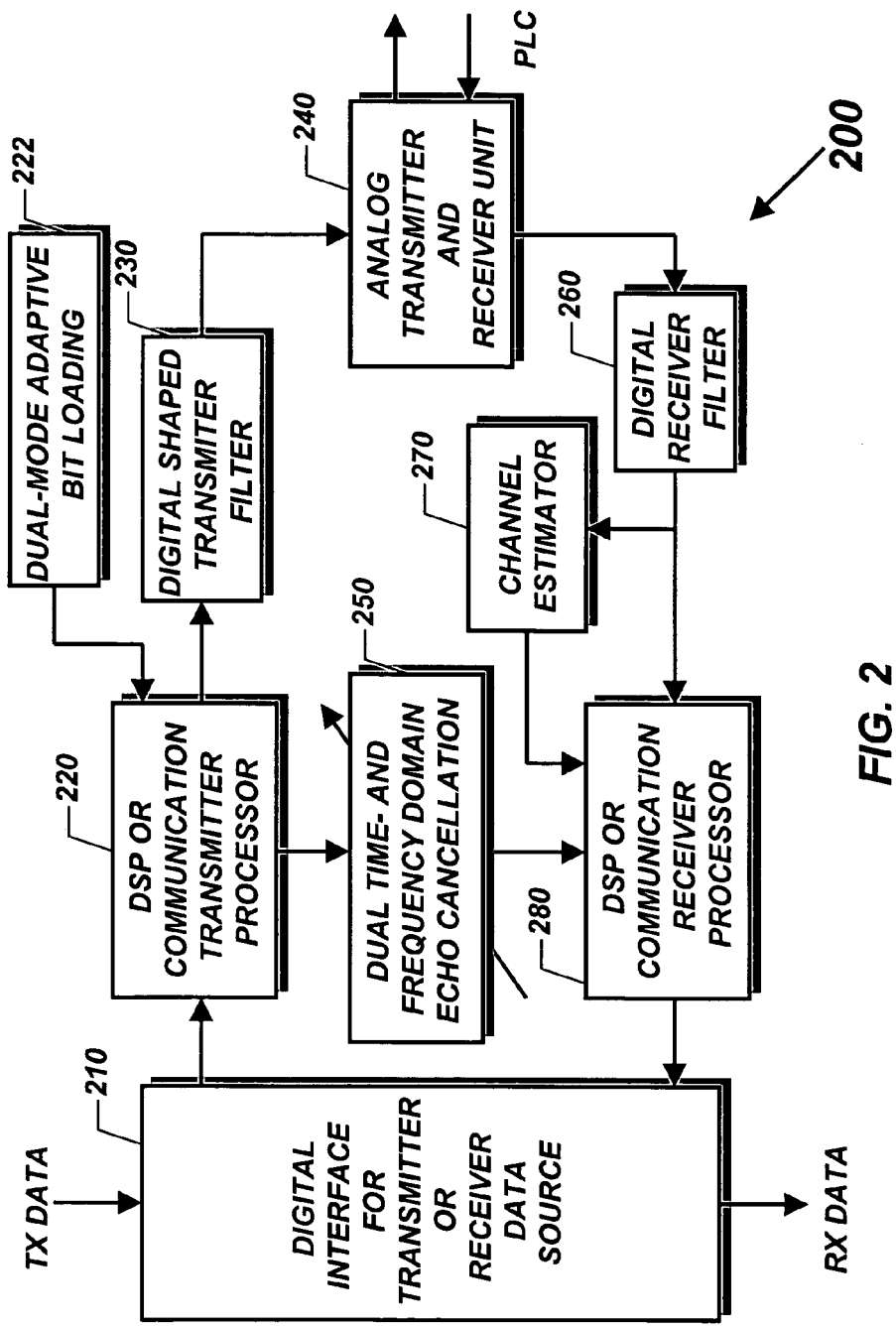
FIG. 2 is a block diagram of showing a wired power line communication transmitter and receiver system according to some embodiments.

FIG. 2 is a block diagram 200 of showing the power line communications transmitter and receiver architecture according to some embodiments. The power line communication transmitter and receiver architecture 200 consists of nine subsystems: digital interface for transmitter or receiver data source 210, DSP/communication transmitter processor 220, dual-mode adaptive bit loading 222, digital shaped transmitter filter 230, analog transmitter and receiver unit 240, dual time- and frequency-domain echo cancellation 250, digital receiver filter 260, channel estimator 270, and DSP/communication receiver processor 280.

In the transmitter section, a digital sequence of TX data is passed into the digital interface for transmitter or receiver data source 210 that is connected to the DSP/communication transmitter processor 220. The dual-mode adaptive bit loading 222 is to couple and provide the bit assignment information for multicarrier-based subchannels of the DSP/communication transmitter processor 220. The output signals of the DSP/communication transmitter processor 220 are passed through the digital shaped transmitter filter 230, which is coupled to the analog transmitter and receiver unit 240 for transmitting data over power line cables.

In the receiver section, signals over power line cables are passed through the analog transmitter and receiver unit 240. The output digital signals of the analog transmitter and receiver unit 240 are fed into the digital receiver filter 260. The digital receiver filter 260 is coupled to both of the channel estimator 270 and DSP/communication receiver processor 280. The channel estimator 270 provides the channel information to the DSP/communication receiver processor 280, which is connected to the digital interface for transmitter or receiver data source 210.

Power Line Communications Transmitter

Figure 3:
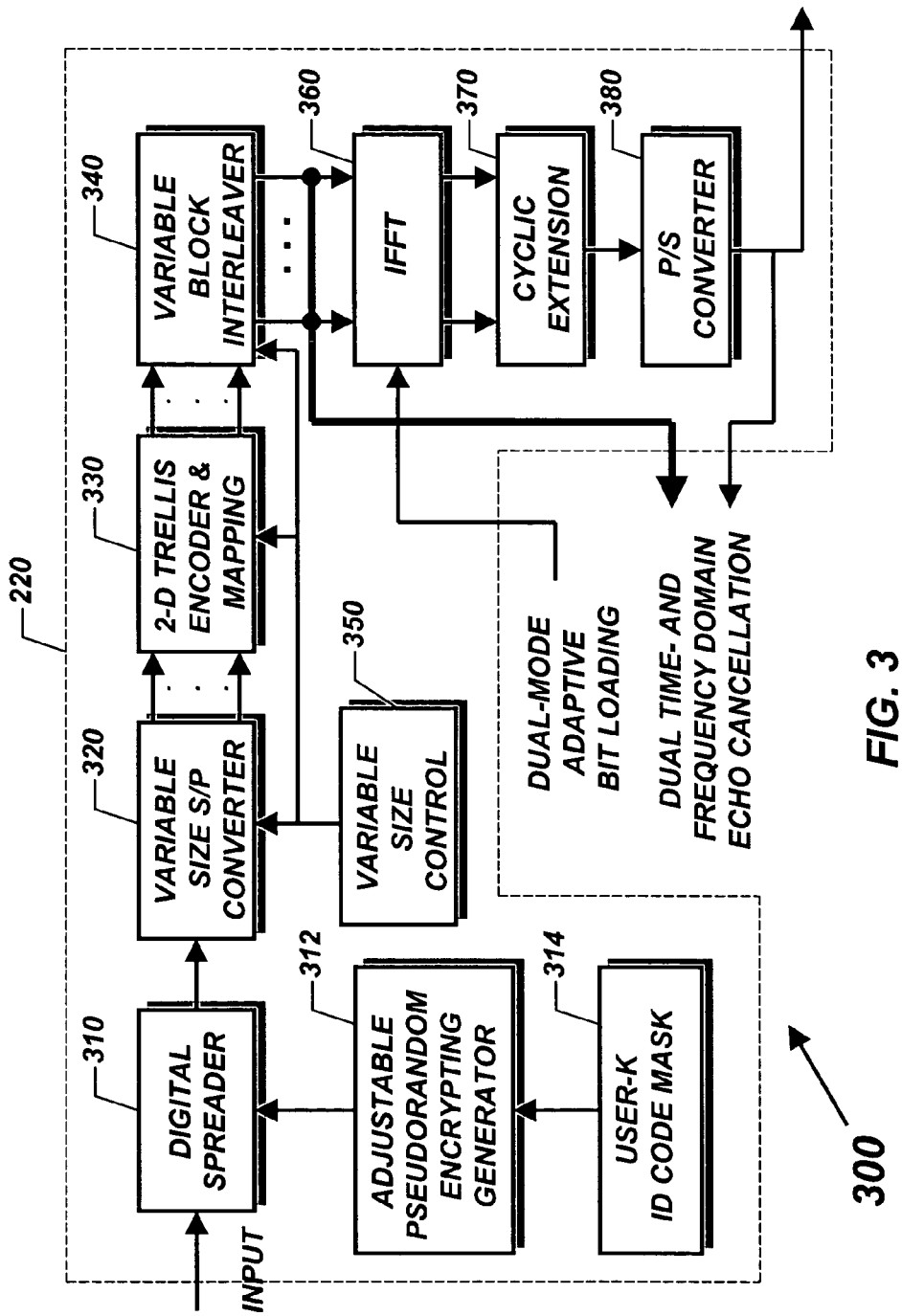
FIG. 3 is a block diagram of showing the power line communication transmitter architecture according to some embodiments.

Referring to FIG. 3 is a detailed block diagram 300 of showing the DSP/communication transmitter processor 220 of the power line communications according to some embodiments. An input sequence stream spread with a pseudorandom sequence directly, which is generated by using an adjustable pseudorandom encrypting generator 312, uses a digital spreader 310 to perform scrambler. User-k identification (ID) code mark 314 that produces a unique mask sequence is connected to the adjustable pseudorandom encrypting generator 312 to embed the unique ID code mask into the pseudorandom sequence. Thus, the pseudorandom sequence that is generated by the adjustable pseudorandom encrypting generator 312 is also a unique sequence for the input sequence stream of the user-k. In other words, a self-correlation of the pseudorandom sequence of the user-k is proximately equal to 1 while as a correlation between the pseudorandom sequence of the user-k with other pseudorandom sequences of other users is almost equal to 0. The output digital sequence of the digital spreader 310 is passed into a variable-size S/P converter 320, which is used to convert the serial input sequence to a variable-size parallel output sequences depending on type of modulations used. The parallel output sequences are fed into a 2-D trellis encoder and mapping 330 to produce mapping signals based on the one of the modulations: QPSK, 16-QAM, 32-QAM, 63-QAM or 128 QAM. The output parallel mapping sequences of the 2-D trellis encoder and mapping 330 are passed into a variable block interleaver 340 to perform block interleaving. A variable size control 350 provides the size of parallel, modulation, and block-size information for the variable size S/P converter 320, the 2-D trellis encoder and mapping 330, and variable block interleaver 340. The output sequences of the variable block interleaver 340 are passed into a dual-mode time- and frequency-domain echo cancellation and also fed into an IFFT 360 to produce multicarrier signals. A dual-mode adaptive bit loading is used to generate bit information for each of subchannels. The output sequences of the IFFT 360 are added cycle bits by using a cycle extension 370. Then, the parallel output sequences are converted into a serial sequence by using a P/S converter 380.

Figure 4:
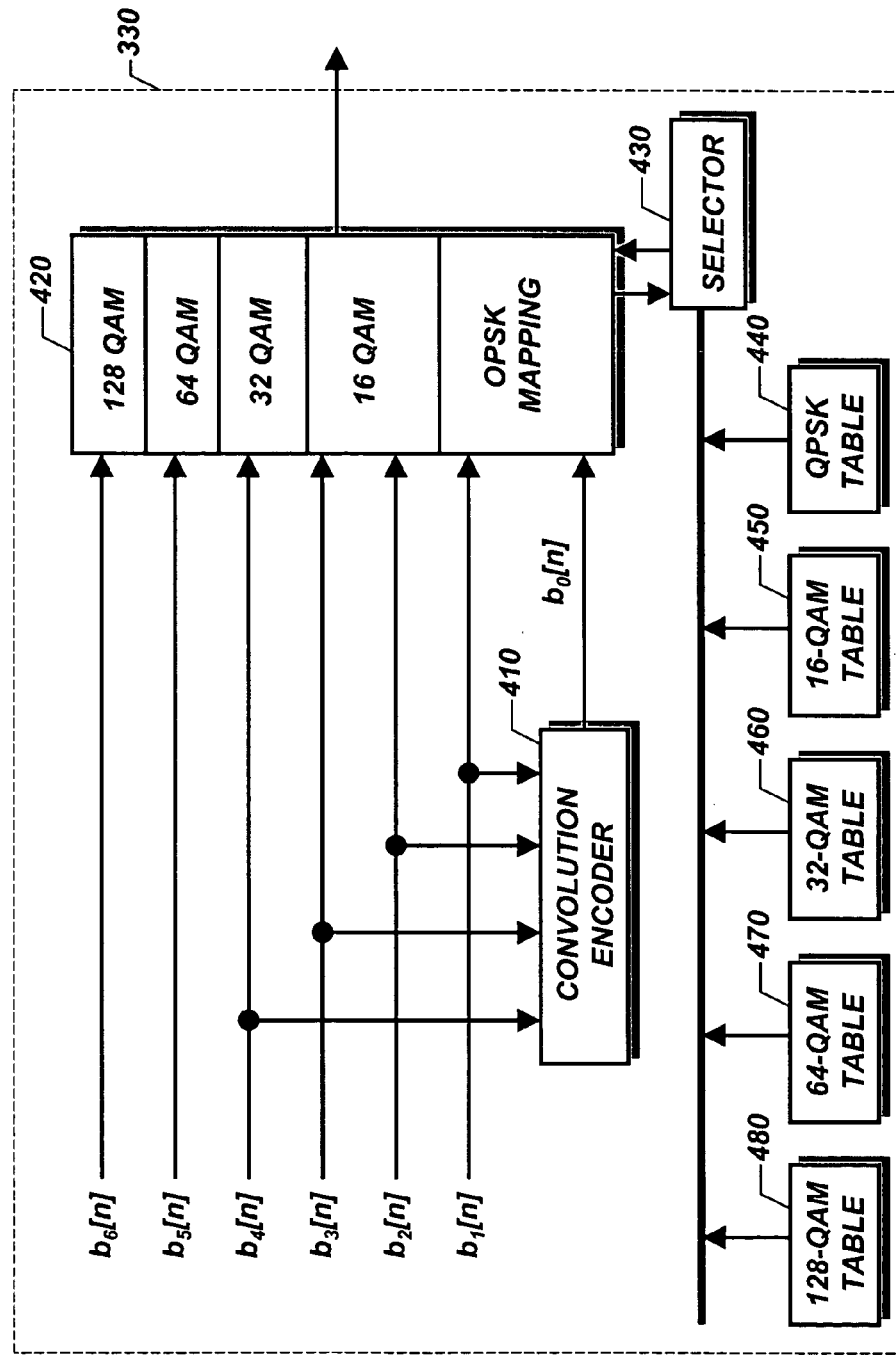
FIG. 4 is a block diagram of showing the 2-D trellis encoder and mapping structure according to some embodiments.

Referring to FIG. 4 is a detailed block diagram 400 of showing the 2-D trellis encoder and mapping 330 according to some embodiments. The 2-D trellis encoder and mapping 330 can produce five types of encoding, modulations, and mapping. (1) When only $b_1[n]$ is as the input sequence, the $b_1[n]$ is passed through a convolution encoder 410 to produce $b_0[n]$. Then $b_0[n]$ and $b_1[n]$ are used to form QPSK mapping. (2) In a same way, when $b_1[n]$, $b_2[n]$, and $b_3[n]$ are as input sequences, the $b_0[n]$, $b_1[n]$, $b_2[n]$, and $b_3[n]$ are used to form 16-QAM mapping. (3) When $b_1[n]$, $b_2[n]$, $b_3[n]$, and $b_4[n]$ are as input sequences, the $b_0[n]$, $b_1[n]$, $b_2[n]$, $b_3[n]$, and $b_4[n]$ are used to form 32-QAM mapping. (4) When $b_1[n]$, $b_2[n]$, $b_3[n]$, $b_4[n]$, and $b_5[n]$ are as input sequences, the $b_0[n]$, $b_1[n]$, $b_2[n]$, $b_3[n]$, $b_4[n]$, and $b_5[n]$ are used to form 64-QAM mapping. (5) When $b_1[n]$, $b_2[n]$, $b_3[n]$, $b_4[n]$, $b_5[n]$, and $b_6[n]$ are as input sequences, the $b_0[n]$, $b_1[n]$, $b_2[n]$, $b_3[n]$, $b_4[n]$, $b_5[n]$, and $b_6[n]$ are used to form 128-QAM mapping. The convolution encoder is (n, k, m) with a k-input, n-output linear sequential circuit with input memory of m. In the present case, the convolution encoder can be used as one of four types: (2, 1, m), (3, 2, m), (4, 3, m) or (5, 4, m). A modulation mapping 420 consists of QPSK, 16-QAM, 32-QAM, 64-QAM and 128-QAM. A selector 430 is coupled to the modulation mapping 420 and is used to select one of modulation mapping from memory tables of QPSK 440, 16-QAM 450, 32-QAM 460, 64-QAM 470, or 128-QAM 480.

Figure 5:
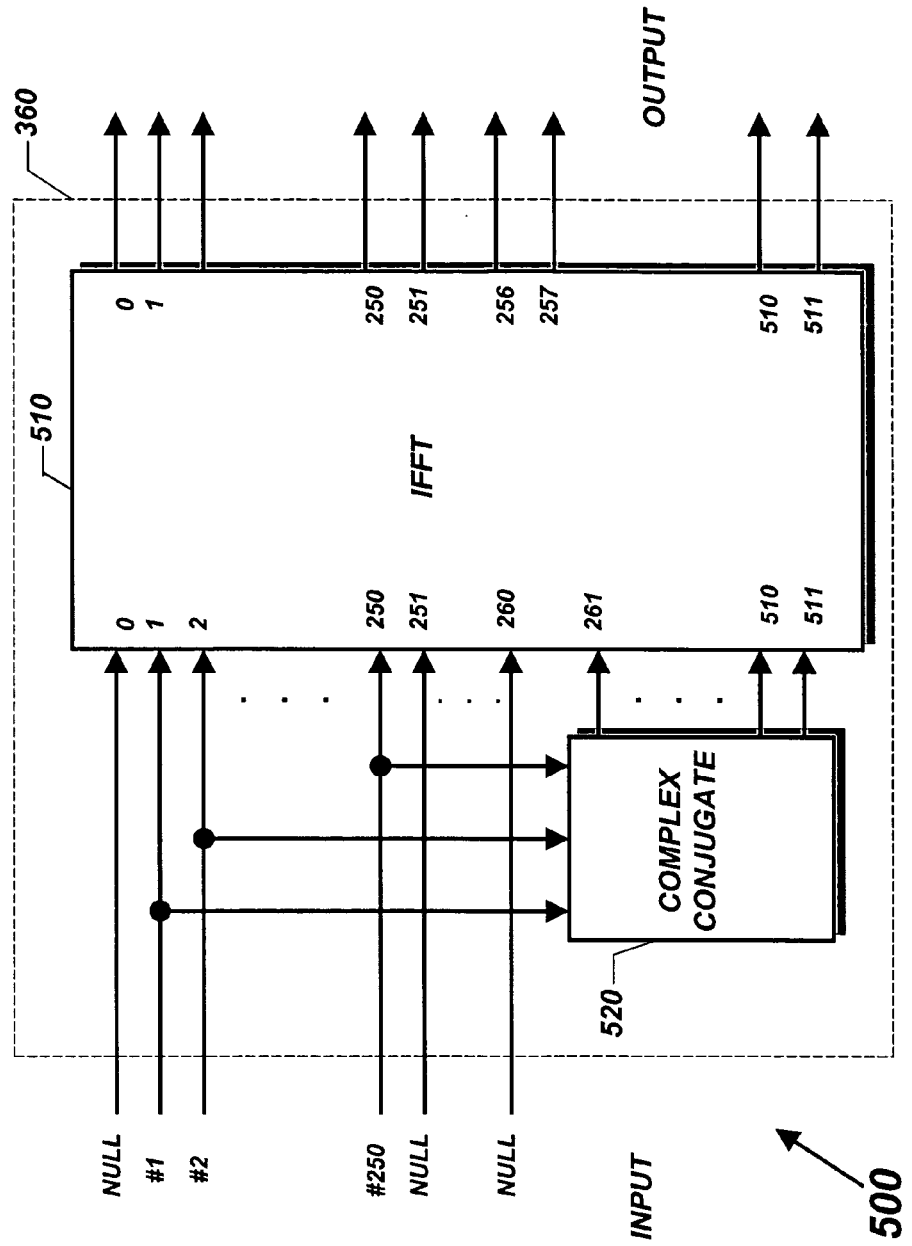
FIG. 5 is a block diagram of showing the 512-point IFFT operation structure according to some embodiments.

Referring to FIG. 5 is a detailed block diagram 500 of showing the 512-point IFFT 360 according to some embodiments. There are 12 Nulls including #0 (DC), and from #251 to #260. The values of the input #0 (DC) and from #251 to #260 are set to zero. The coefficients of 1 to 250 are mapped to the same numbered IFFT inputs #1 to #250, while the coefficients of 250 to 1 are passed through a complex conjugate 520 and also copied into IFFT inputs of #261 to #511 to form a complex sequence. Thus, there are a total of 500 subcarriers for transmitting data and pilot information. In order to make a coherent detection robust against frequency offsets and phase noise, four of the 500 subcarriers are dedicated to pilot signals, which are assigned into the subcarriers of #100, #200, and #362, and #462. These pilots are BPSK modulated by a pseudo binary sequence to prevent a generation of spectral lines. In this case, other 496 subcarriers of the DMC are dedicated to assign for transmitting data information.

The data rate-dependent parameters of the 512-point IFFT operations in the downlink data stream are shown in Table 1. As can be seen, the power line communications modem is able to transmit variable transmission data rates from 31.0 Mbps to 173.6 Mbps over a power line cable.

TABLE 1

| Data rate (Mbps) | Modulation | Coding rate | Coded bits per subcarrier | Coded bits per DMC symbol | Data bits per DMC symbol |
|---|---|---|---|---|---|
| 15.50 | BPSK | 1/2 | 1 | 496 | 248 |
| 23.25 | BPSK | 3/4 | 1 | 496 | 372 |
| 31.00 | QPSK | 1/2 | 2 | 992 | 496 |
| 46.50 | QPSK | 3/4 | 2 | 992 | 744 |
| 62.00 | 16-QAM | 1/2 | 4 | 1984 | 992 |
| 93.00 | 16-QAM | 3/4 | 4 | 1984 | 1488 |
| 116.25 | 32-QAM | 3/4 | 5 | 2480 | 1860 |
| 124.00 | 32-QAM | 4/5 | 5 | 2480 | 1984 |
| 124.00 | 64-QAM | 2/3 | 6 | 2976 | 1984 |
| 139.50 | 64-QAM | 3/4 | 6 | 2976 | 2232 |
| 162.75 | 128-QAM | 3/4 | 7 | 3472 | 2604 |
| 173.60 | 128-QAM | 4/5 | 7 | 3472 | 2777.6 |

Table 2 lists the 512-point IFFT of timing-related parameters for the downlink data streams in the frequency band.

TABLE 2

| Parameters | Descriptions | Value |
|---|---|---|
| $N_{ds}$ | Number of data subcarriers | 496 |
| $N_{ps}$ | Number of pilot subcarriers | 4 |
| $N_{ts}$ | Number of total subcarriers | 500 |
| $D_{fs}$ | Frequency spacing for subcarrier (40 MHz/512) | 78.125 kHz |
| $T_{FFT}$ | IFFT/FFT period ($1/D_{fs}$) | 12.8 μs |
| $T_{gd}$ | Guard duration ($T_{FFT}/4$) | 3.2 μs |
| $T_{signal}$ | Duration of the signal BPSK-DMC symbol ($T_{FFT} + T_{gd}$) | 16 μs |
| $T_{sym}$ | Symbol interval ($T_{FFT} + T_{gd}$) | 16 μs |
| $T_{short}$ | Short duration of training sequence ($10 \times T_{FFT}/4$) | 32 μs |
| $T_{gd2}$ | Training symbol guard duration ($T_{FFT}/2$) | 6.4 μs |
| $T_{long}$ | Long duration of training sequence ($2 \times T_{FFT} + T_{gd2}$) | 32 μs |
| $T_{preamble}$ | Physical layer convergence procedure preamble duration ($T_{short} + T_{long}$) | 64 μs |

Adaptive Bit Loading Approach

Figure 6:
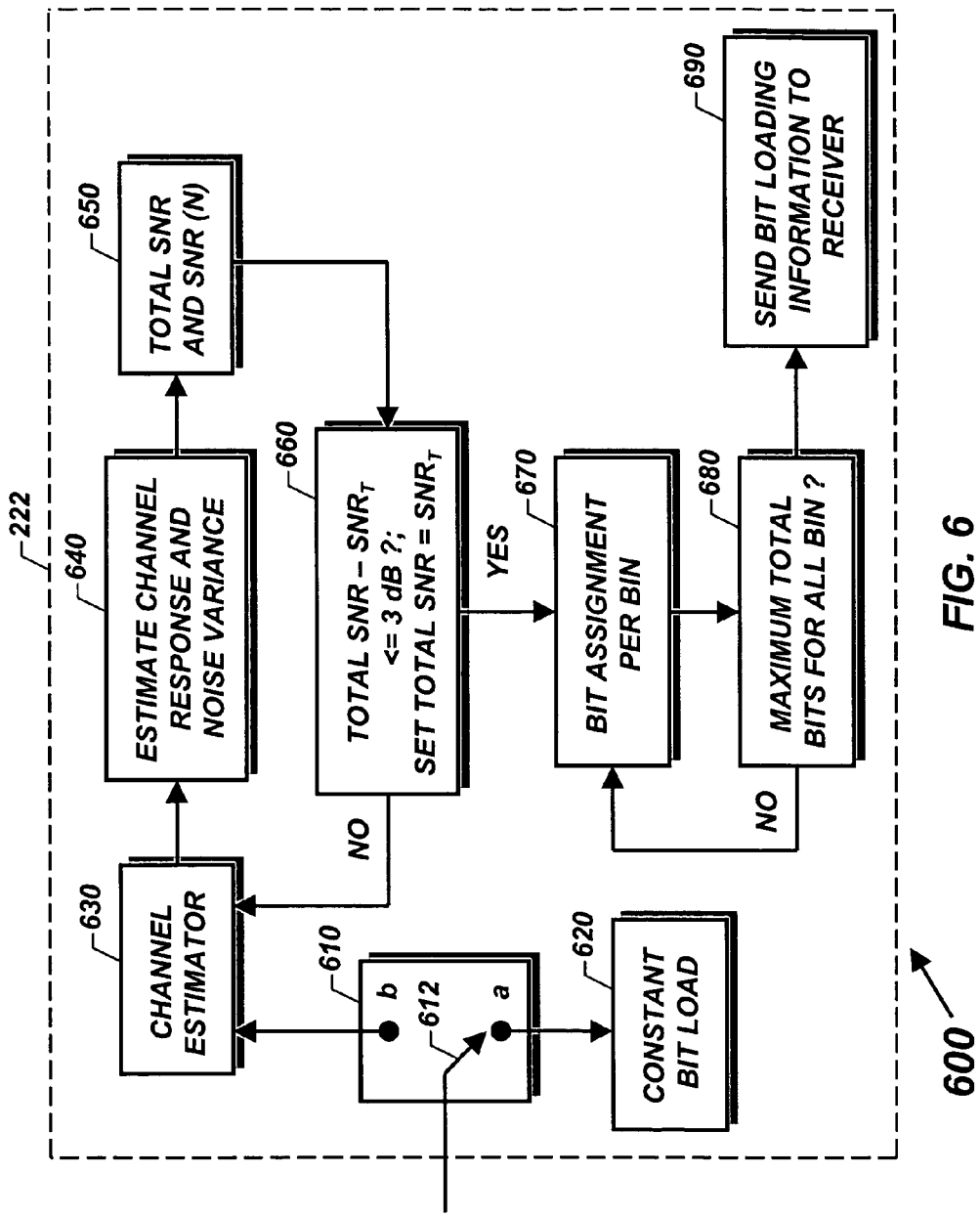
FIG. 6 is a block diagram of showing the dual-mode adaptive bit loading approach according to some embodiments.

FIG. 6 is a block diagram 600 of showing a dual-mode adaptive bit loading approach 222 according to some embodiments. The dual-mode adaptive bit loading approach 222 that is controlled by a switch unit 610 has two mode operations: (1) adaptive bit loading; and (2) constant bit loading for subchannels. The switch unit 610 contains a switch 612. When the switch 612 turns to a position of "a," the switch is connected with a constant bit loading 620 that assigns constant bits for all of the subchannels. When the switch turns to a position of "b," the switch is connected with a channel estimator 630. The channel estimator 630 is coupled to an estimate of the channel response and noise variance 640 to calculate a total of SNR and SNR(N) 650, where SNR(N) is SNR for subchannels. If SNR is less than 3 dB of $SNR_T$ 660, where $SNR_T$ is a threshold of SNR that is prior determined, then the adaptive bit loading approach uses previous assigned bits for subchannels and adaptive bit loading approach continues to measure the channel estimator 630 periodically. On the other hand, if SNR is greater than 3 dB of $SNR_T$ 660, then SNR is set to as the $SNR_T$. Thus, adaptive bit loading approach is to reassign the number of bits for subchannels in a bit assignment per bin 670. In this case, the adaptive bit loading approach determines if a total number of bits for all of bins are achieved in maximum 680. If this is not case, the adaptive bit loading approach reassigns bits per bin 670. If this is a case, the adaptive bit loading approach sends bit loading information to a receiver 690.

Power Line Communications Receiver

Figure 7:
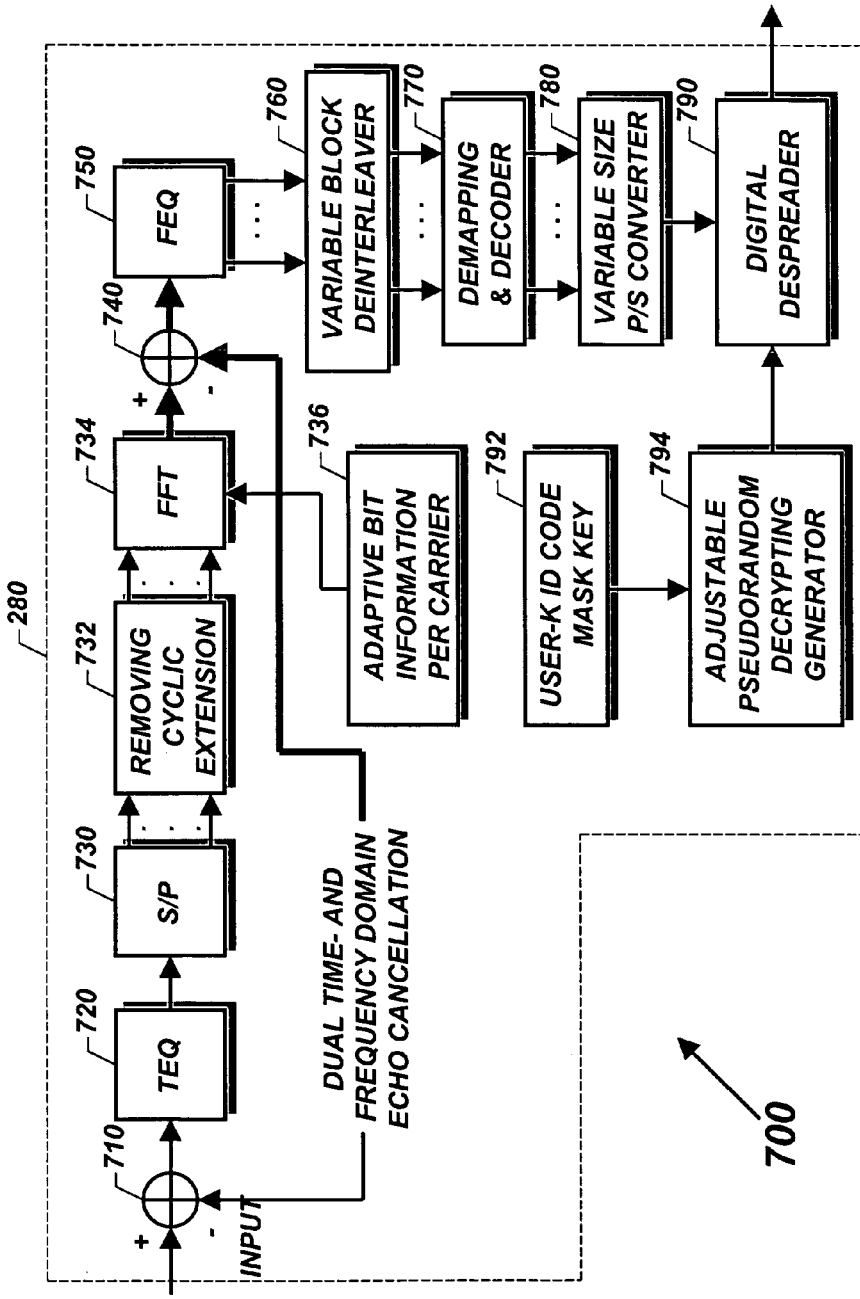
FIG. 7 is a block diagram of showing the power line communication receiver architecture according to some embodiments.

FIG. 7 is a block diagram 700 of showing a DSP/communication receiver processor 280 according to some embodiments. An input digital sequence is subtracted from the output of the dual time- and frequency-domain echo cancellation by using a subtractor 710. The output digital sequence is fed into a time-domain equalizer (TEQ) 720. The TEQ 720 is used to reduce the length of cyclic prefix to a more manageable number without reducing performance significantly. In other words, the TEQ 720 can produce a new target channel with a much smaller effective constraint length when concatenated with the channel. Then, the outputs of the TEQ 720 are passed through a serial-to-parallel (S/P) 730 to produce parallel digital sequences. The cycle extensions of parallel digital sequences are removed by using a removing cycle extension 732. The output parallel sequences of the removing cycle extension 732 are fed into a FFT 734 to produce the parallel frequency-domain sequences. The adaptive bit information per carrier 736 is coupled to the FFT 734 to provide bit assignment information for DMC. The parallel output sequences of the FFT 734 are subtracted from the output of the dual time- and frequency-domain echo cancellation by using a subtractor 740. The parallel output sequences of the subtractor 740 are fed into frequency-domain equalizers (FEQ) 750. The FEQ 750 is used to compensate for phase distortions that are a result of phase offsets between the sampling clocks in the DMC-based transmitter and the DMC-based receiver of the power line communications transceiver. This is because the phases of the received outputs of the FFT 734 are unlikely to be exactly the same as the phases of the transmitter symbols at the input to the IFFT of the power line communications transmitter. Then, the outputs of the FEQ 750 are passed through a variable block deinterleaver 760 for block deinterleaving. The parallel output sequences of the variable block deinterleaver 760 are passed through a demapping and decoder 770 to decode the user-k data information. Thus, the parallel output sequences are converted into a serial digital sequence by using a variable-size parallel-to-serial (P/S) converter 780. The resulted serial digital sequence is decrypted with an output pseudorandom sequence of an adjustable pseudorandom decrypting generator 794. A user-k ID mask key 792 is coupled to the adjustable pseudorandom decrypting generator 794 to provide a unique pseudorandom sequence of the user-k for descrambler.

Figure 8:
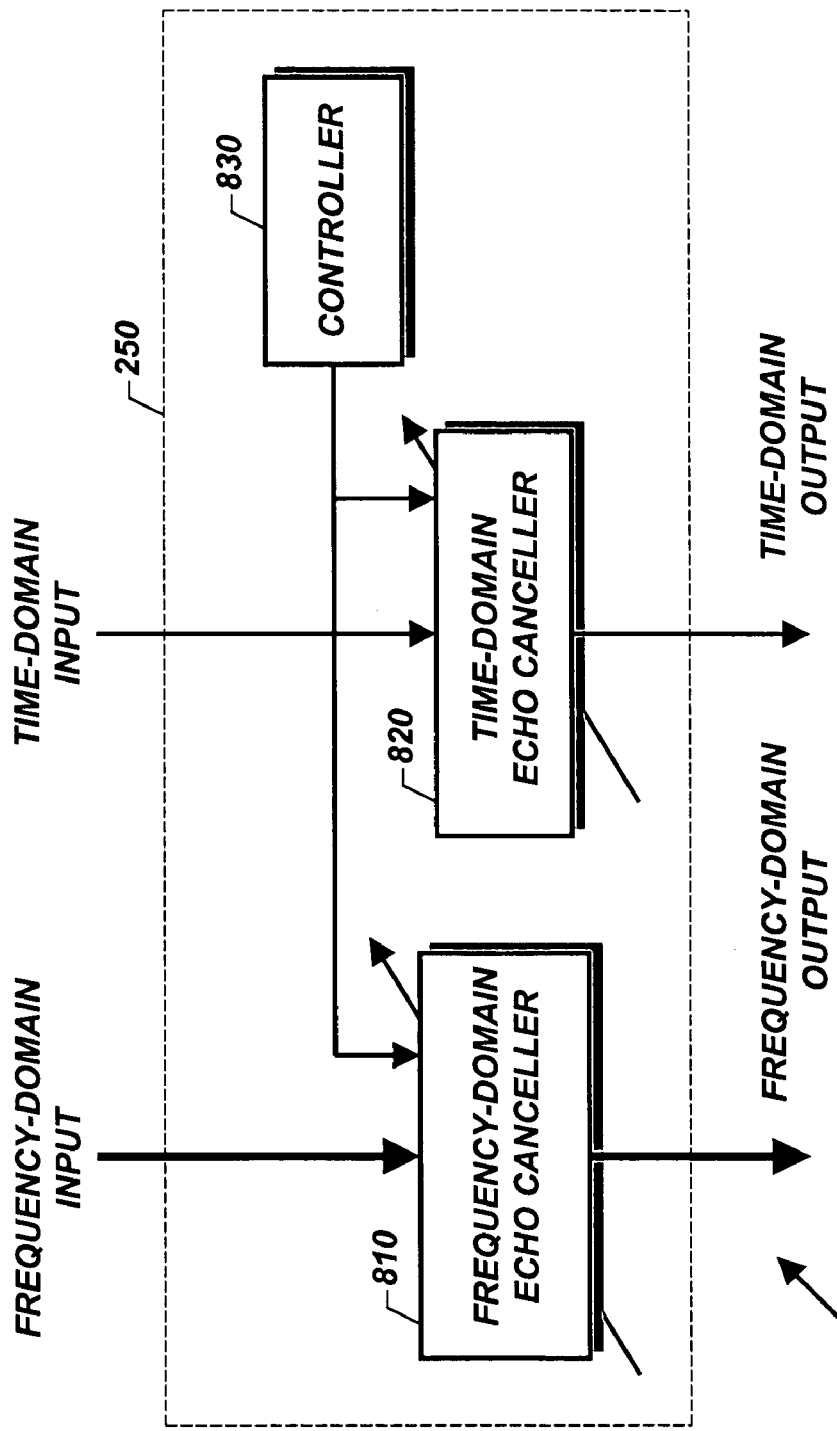
FIG. 8 is a block diagram of showing the dual-mode adaptive time- and frequency-domain echo canceller according to some embodiments.

Referring to FIG. 8 is a block diagram 800 of showing the dual time- and frequency-domain cancellation 250 according to some embodiments. Parallel frequency-domain input sequences are fed into a frequency-domain echo canceller 810 to produce parallel frequency-domain output sequences. On the other hand, a serial time-domain input sequence is fed into a time-domain echo canceller 820 to produce a serial output sequence. Both of the frequency-domain echo canceller 810 and time-domain echo canceller 820 have adjustable filter taps. Adaptive algorithms may use either the least mean squares (LMS) or the recursive least squares (RLS). A controller 830 is used to control four operation modes for both of the frequency-domain echo canceller 810 and time-domain echo canceller 820. The four operation modes are as follows: (1) turn-on both of the frequency-domain echo canceller 810 and time-domain echo canceller 820; (2) turn-on the frequency-domain echo canceller 810 only; (3) turn-on the time-domain echo canceller 820 only; or (4) turn-off both of the frequency-domain echo canceller 810 and time-domain echo canceller 820. Thus, selecting one of four operation modes is depended on how severity of echo presents in the power line communications.

Downlink and Uplink PSD Masks

Figure 9:
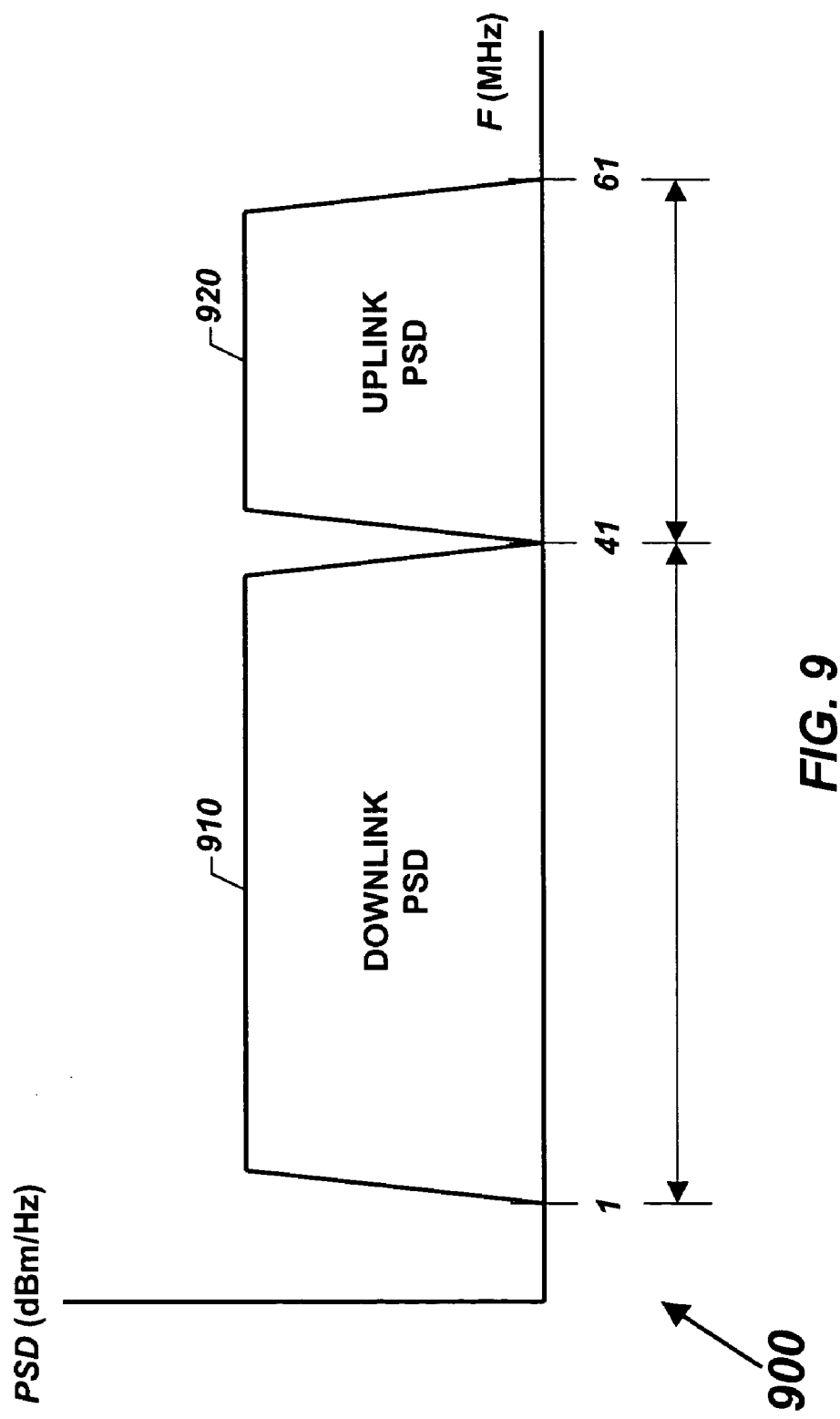
FIG. 9 is a graph diagram of showing the downlink PSD and uplink PSD masks of the wired power line communications according to some embodiments.

FIG. 9 is a power spectral density (PSD) 900 of showing a downlink PDS mask 910 and uplink PSD mask 920 with x-axis in MHz and y-axis in dBm/Hz according to some embodiments. Since the power line cables of any power supply grids have been designed for transportation at frequencies of 50 or 60 Hz, using them for power line communications means they will have to carry signals at frequencies over 60 Hz. Thus, in this invention, the power line communications modem have been designed to carry signals at frequencies from 1 MHz to 41 MHz for downlink data streams and from 41 MHz to 61 MHz for uplink data streams. As a result, the data rates of the downlink data streams are higher than the data rates of the uplink data streams. Hence, the power line communications modem is capable of providing asymmetric or symmetric data service over power line cables.

While the present inventions have been described with respect to a limited number of embodiments, those skilled in the art will appreciate numerous modifications and variations therefrom. It is intended that the appended claims cover all such modifications and variations as fall within the true spirit and scope of these present inventions.

What is claimed is:

1. A dual-mode wireless and wired power line communications system comprising:
    a MIMO-based wireless modem;
    a power line communications modem;
    a micro-controller coupled to both of said MIMO-based wireless modem and said power line communications modem;
    said MIMO-based wireless modem coupled to N antennas and coupled to said power line communications modem, where N is an integer and greater than 1;
    said power line communications modem connected to a power line central modem in a local transformer station over a power line cable; and
    said power line central modem in a local transformer station coupled to a power line communications backbone gateway.

2. The dual-mode wireless and wired power line communications system of claim 1 wherein said MIMO-based wireless modem can be one of type modems, including a MIMO-based WLAN, a MIMO-based UWB, any combinations of dual/triple-mode WLAN, any combinations of WLAN and UWB modem, a wireless phone, or a portable wireless device.

3. The dual-mode wireless and wired power line communications system of claim 1 wherein said power line communications modem further contains:
    a DSP/communication transmitter processor;
    a Digital shaped transmitter filter;
    a dual-mode adaptive bit loading approach;
    a time- and frequency-domain echo cancellation;
    a DSP/communication receiver processor;
    a channel estimator;
    a digital receiver filter; and
    an analog transmitter and receiver unit.

4. The dual-mode wireless and wired power line communications system of claim 3 wherein said DSP/communication transmitter processor further includes:
    a user-k ID code mask coupled to an adjustable pseudorandom encrypting generator that is coupled to a digital spreader;
    a variable-size S/P converter coupled to a 2-D trellis encoder and mapping that is coupled to a variable block interleaver;
    an IFFT coupled to cyclic extension that is coupled to P/S converter; and
    a variable-size control.

5. The dual-mode wireless and wired power line communications system of claim 4 wherein said adjustable pseudorandom encrypting generator produces a unique pseudorandom sequence of the user-k with adjustable length, which the unique pseudorandom sequence is orthogonal to other pseudorandom sequences.

6. The dual-mode wireless and wired power line communications system of claim 4 wherein said 2-D trellis encoder and mapping further comprises:
    B bit inputs in parallel, where B is an integer;
    a convolution encoder (n, k, m) with k-input, n-output linear sequential circuit with input memory of m;
    a modulation mapping;
    a QPSK table;
    a 16-QAM table;
    a 32-QAM table;
    a 64-QAM table;
    a 128-QAM table; and
    a selector.

7. The dual-mode wireless and wired power line communications system of claim 6 wherein said 2-D trellis encoder and mapping can produce different encoding and modulation mapping in terms of QPSK, QAM and other modulations.

8. The dual-mode wireless and wired power line communications system of claim 6 wherein said convolution encoder can be one of types, including (2, 1, m), (3, 2, m), (4, 3, m) or (5, 4, m), where m is an integer and input memory.

9. The dual-mode wireless and wired power line communications system of claim 4 wherein the IFFT has 512-point pins including:
    12 Nulls in the pin #0 (DC) and pins from #251 to #260 with zero value;
    coefficients of 1 to 250 mapped to the pins #1 to #250;
    the coefficients of 250 to 1 passed through a complex conjugate and copied into pins #261 to #511;
    496 subcarriers for transmitting data; and
    4 subcarriers for pilots that are BPSK modulated by a pseudo binary sequence.

10. The dual-mode wireless and wired power line communications system of claim 4 wherein the variable-size control provides adjustable parallel-size information to the variable-size S/P converter, the 2-D trellis encoder and mapping, and the variable block interleaver.

11. The dual-mode wireless and wired power line communications system of claim 3 wherein the dual-mode adaptive bit loading approach has two operation modes, including a constant bits assignment and an adaptive bits loading assignment.

12. The dual-mode wireless and wired power line communications system of claim 11 wherein the adaptive bits loading assignment further includes:
    performing channel estimation;
    estimating channel response and noise variance;
    calculating total SNR and $SNR_N$, where $SNR_N$ is the Nth subchannel SNR;
    determining a difference between SNR and $SNR_T$, where $SNR_T$ is a threshold;
    assigning number of bits per subchannel;
    getting maximum bits for all the subchannels; and
    sending bits loading information to a receiver.

13. The dual-mode wireless and wired power line communications system of claim 3 wherein the time- and frequency-domain echo cancellation has four operation modes including:
    turning on both of frequency-domain echo canceller and time-domain echo canceller;
    turning on the frequency-domain echo canceller only;
    turning on the time-domain echo canceller only; or
    turning off both of the frequency-domain echo canceller and time-domain echo canceller.

14. The dual-mode wireless and wired power line communications system of claim 3 wherein the DSP/communication receiver processor further comprises:
- a TEQ coupled to a S/P, which is coupled to a removing cyclic extension followed by a FFT;
- an adaptive bit information per carrier coupled to said FFT that is coupled to a subtractor;
- said subtractor coupled to a FEQ that is coupled to a variable block deinterleaver followed by a demapping and decoder;
- said demapping and decoder coupled to a variable-size P/S converter followed by a digital despreader; and
- a user-k ID mask key coupled to an adjustable pseudo-random decrypting generator, which provides a unique pseudorandom sequence for said digital despreader.

15. A dual-mode wireless and wired power line communications system has:
- N antennas coupled to a residential dual-mode wireless and wired power line basestation that is coupled to a power line central modem followed by a power communications backbone gateway, where N is an integer;
- said residential dual-mode wireless and wired power line basestation further including a MIMO-based wireless modem, a microcontroller, and a power line communications modem;
- said MIMO-based wireless modem coupled to said microcontroller followed by said power line communications modem, which also is connected with said MIMO-based wireless modem;
- said power line communications modem coupled to said power line central modem; and
- said power line communications modem having M interfaces that are used to connect with a HDTV, a computer, and/or user devices, where M is an integer.

16. A dual-mode wireless and wired power line communications system of claim 15 wherein said power line communications modem transmits and receives scalability data rates.

17. A dual-mode wireless and wired power line communications system of claim 15 wherein said power line communications modem further including:
- a digital interface coupled to a communication transmitter and a communication receiver;
- a dual-mode time-domain and frequency-domain echo cancellation coupled to said communication transmitter and said communication receiver;
- said communication transmitter coupled to a digital shaped transmitter filter followed by an analog transmitter and receiver unit;
- a dual-mode adaptive bit loading approach coupled to said communication transmitter;
- said analog transmitter and receiver unit coupled to a digital receiver filter;
- said digital receiver filter coupled to a channel estimator and said communication receiver; and
- said channel estimator coupled to said communication receiver.

18. A dual-mode wireless and wired power line communications system of claim 17 wherein said dual-mode adaptive bit loading approach uses storing instructions to selectively set for a constant bits loading mode or an adaptive bits loading mode.

19. A dual-mode wireless and wired power line communications system of claim 17 wherein said dual-mode time-domain and frequency-domain echo cancellation is programmable to operate at different modes.

20. A dual-mode wireless and wired power line communications system of claim 15 wherein said power line communications modem can be used to delivery Internet television services at user devices.

* * * * *